Patented Jan. 17, 1939

2,144,471

UNITED STATES PATENT OFFICE 2,144,471

PROCESS FOR PREPARING A BREWING ADJUNCT

James F. Walsh, Chicago, and Willard L. Morgan, Calumet City, Ill., assignors to American Maize-Products Company, a corporation of Maine No Drawing. Application August 20, 1937, Serial No. 160,057. Renewed December 3, 1938

13 Claims. (Cl. 99—50)

Our invention relates to adjuncts for brewing materials and more particularly to an improved process for preparing a starch-protein composition to be used as an adjunct for increasing fermentation rate and improving the quality of the fermented product, e. g. beer.

In the manufacture of beer it is common practice to use malted grains as the basis for the mash prior to fermentation. It has been found that the malted grains are capable of converting a substantially greater amount of starch than that present in the grain itself and therefore it has been proposed to add other starchy materials to the malted grains. These additional materials give the beer a relatively high solids content and at the same time reduce the cost since the added starch is less expensive than the malt.

In adding starch as an adjunct to the malted grains additional sugars are made available for fermentation but at the same time the proteins and soluble salts contained in the malted grains and which are necessary for fermentation are thereby diluted. Fermentation rates are thus decreased and a new limit is placed upon the amount of starch that may be added as an adjunct to the malt. Other undesirable effects arising from dilution of the proteins in the beer by the starch adjunct are, decrease in taste and smaller foam retention value or smaller head in the beer produced. In view of these limitations to the use of starch as an adjunct to brewers malt, it has also been suggested that organic nitrogenous plant material be added to the malt in addition to the starch to overcome the dilution effect of the latter. One example of this nitrogenous material, which has been proposed for use in brewing, is concentrated steep water. This is obtained by concentrating some of the water from the corn steeping tanks commonly used in the manufacture of starch from corn. This steep water contains some of the soluble proteins and other soluble solids normally present in corn.

One of the prior art methods of using steep water and starch as an adjunct for brewing materials consists in concentrating the steep water to a very high solids content and then adding the concentrated residue to the malt either separately or admixed with the starch. In this process it is necessary to effect high concentrations of the steep water before it is added to the starch in order to avoid the expense and disadvantages of redrying the previously dried starch. This concentration process is difficult to carry out and is characterized by the disadvantage of darkening the steep water adjunct and likewise the final brew product due to the prolonged heat treatments employed in concentrating the steep water. Another disadvantage to this process is that the heat coagulated proteins, which are undesirable in fermentation processes, are carried into the brewing material. These coagulated proteins do not serve any useful purpose in the fermentation action and furthermore form a slimy type of precipitate that clouds the beer so that it cannot be satisfactorily clarified by filtration.

An object of our invention is to provide an improved process for making a starch-protein composition that can be used as a brewer's adjunct to increase the rate of fermentation and to produce a superior fermented product.

We have discovered that the disadvantages and limitations of the processes heretofore used, such as the one described above, may be overcome by an improved method of treatment of the steep water and by an improved method of incorporating the treated steep water in the starch before the latter is dried. We have found that if the steep water, as it comes from the corn steeping tanks, is carefully purified of the undesirable heat coagulable proteins, it may be incorporated in the starch directly without concentration to produce an improved starch-protein composition that contains only the desirable protein content of the steep water and that will function most efficiently in brewing processes. It will effect the desired rapid production of an improved sparkling beer having desirable color and being free of undesirable solids. The process of our present invention comprises generally the treatment of corn steep water to effect partial neutralization thereof with consequent coagulation and elimination of the undesirable constituents, and then incorporating the purified steep water in wet starch, and drying the admixture to form the desired starch-protein adjunct.

The steep water used in our process may be rendered suitable for brewing purposes by the following procedure. It is advisable to remove from the steep water those proteins that will coagulate on heating and also remove some or all of the sulphur dioxide compounds and eliminate the excess acidity of the water. As a general rule, we prefer to keep relatively low the concentration of material which will leave a residue of ash on analysis. An unduly high ash content would indicate the presence of an excess of inorganic salts which might tend to render the beer salty and these materials might also tend to produce an undesirable grittiness in the beer.

However, some salts, particularly the phosphates, and some of the native salts of the corn, are desirable in the finished product.

The undesirable ingredients in regular steep water can be eliminated, without destroying the desirable proteins and other desirable ingredients, through the simple expedient of neutralizing the steep waters to approximate neutrality or very slightly on the acid side, say to a pH of between 5 and 7 and preferably between 6 and 7. A value of 6.2 has given advantageous results. For this neutralization we prefer to use ordinary hydrated lime but other basic materials which will form substantially insoluble sulfites or sulfates may be used. Sodium carbonate may also be used. The coagulated solid materials resulting from this neutralization are removed by filtering or in any other convenient manner.

If desired, the steep water may be given a preliminary boiling for a few minutes to drive off free sulphur dioxide. However, such treatment is not necessary for the purposes of the present invention since proper neutralization at ordinary room temperature will cause the precipitation of undesirable proteins as well as the precipitation of the major portion of the soluble sulfites or sulfates. The removal of proteins that will coagulate on heating is desirable, for they would be of no value because their coagulation during sterilization would render them non-assimilable by the organism, and their presence would render it difficult to standardize the product from a physiological viewpoint. The same treatment will remove some of the salts so that actually there is a direct reduction in the ratio of ash to protein, and after filtration the remaining liquid carries a substantial percentage of desirable protein and protein derivatives without being unduly salty or bitter. While the neutralization might slightly pass over to the alkaline side, any substantial alkalinity usually should be avoided, as ordinarily it is undesirable to have an alkaline taste in the finished product. Furthermore, when actual alkalinity is had, the phosphates tend to precipitate as tri-calcium phosphate and the removal of all the phosphates and certain other native salts of the corn is not usually desirable.

To obtain complete elimination of sulphur dioxide and its compounds from the steep water either before or after neutralization, the steep water may be treated with an oxidizing agent such as sodium hypochlorite or hydrogen peroxide. As a specific example, untreated steep water having a total solids content of 6.65, an ash content of .89%, a protein content of 3.64, and a pH of 4.1 when treated with lime and hydrogen peroxide, as described, and after filtration, contained 6.14% total solids, .77% ash, 3.48% protein and had a pH of 6.2.

As a result of the above described purification of the steep water with lime and an oxidizing agent, practically all of the sulphur dioxide and heat coagulable proteins are removed along with some of the organic and inorganic phosphates as well as calcium sulfite. The treated water after filtering to remove all of the insoluble material will contain soluble non-coagulable proteins, amino acids, phosphates and salts. This purified steep water is now ready for incorporation in the starch. This may be effected by either one of the following two procedures. Wet starch, as secured from any separation process or from filter presses and substantially free of insoluble proteins, is dumped into a tank containing the above described treated steep water. The wet starch cake as it comes from the filter presses used in the final washing of the separated starch, or from the first press after separation of the starch on tables, contains about 40% to 45% of water. This wet starch cake is thoroughly mixed in the treated steep water to obtain a uniform suspension with thorough incorporation of the steep water in the starch. The starch-steep water suspension is then run over a filter press which removes the excess liquid. After this treatment the wet starch cake will contain about 40% to 45% of the treated steep water. This cake is now dried as described below to a water content of about 10%, and as such is ready for use in brewing. The treated steep water may be applied to the starch and thereby mixed with the same by applying the treated steep as a wash, or spray water to the starch cake while still upon the filter press.

In order to prevent the soluble solids from collecting on the surface of the treated starch as would normally occur if the starch were dried in the ordinary kiln or shelf driers, a rapid means of drying is employed. This drying may be carried out by subjecting the treated starch to a current of dry air such as is obtained in the well known cyclones. Rapid shelf drying may be employed if the starch mass is agitated frequently as is done in the so-called Buell driers. If the starch is dried in a kiln it is subsequently passed through starch grinding mills and blending hoppers to secure a uniform product.

Instead of adding the wet starch cake to the treated steep water as described above, the treated steep water may be incorporated in the starch according to the following procedure. The starch that settles on the tables as a result of the well known tabling operation, is washed from the tables with the treated steep water. As a result of this washing the treated steep water is thoroughly incorporated in the starch and the resulting starch-steep water admixture containing approximately 40% to 45% of the treated steep water can then be dried according to any one of the suitable methods such as mentioned above.

According to one specific example of the process described above 100 pounds of the treated steep water were admixed with about 50 pounds of the wet starch to form a 14° Bé. suspension which when dried produced a starch-protein composition having a pH of about 7, an ash content of about 0.79%, a protein content of about 2.31% and having substantially the same body and consistency as a similar starch which has not been combined with the treated steep water. In view of the fact that the treated steep water has not been concentrated according to the usual prior practices the resulting starch-protein composition contains no undesirable color and will not adversely affect the desired properties of the beer or other fermented product for which it is used.

If desired the starch used in the present invention may be slightly prepasted, i. e. gelatinized either just prior to or during the combining of the starch with the treated steep water, by heating the starch to a temperature of about 150° F. This slight prepasting renders the starch more easily assimilable by the diastatic enzymes in the brewing malt thus leading to early fermentation.

It will be apparent from the foregoing that in carrying out the process of our invention we may use steep water containing the normal variations in solids content experienced in the steeping of corn. If the steep water which is used in this invention is drawn off from the steep tanks after the steeping operation has continued for a considerable time, the solid content is naturally greater than that of steep water drawn off from the steep tanks shortly after the corn has been placed in these tanks. The Baumé of the treated steep water may vary, for example, from about 2.8 to 7.0 with a variation of about 5% to 25% for the total solids content. If desired, a slightly more concentrated form of steep water which contains a higher percentage of ash, salts, phosphates and proteins may be diluted. Likewise, if the steep water first drawn off from the steep tanks is too dilute its solids content may be increased somewhat by the addition of more concentrated steep water. A variation in the amount of steep water added to the starch may arise from the use of different types of filters which give different moistures in the starch cakes. Likewise the amount of steep water added to the starch may be varied widely by making up the starch-steep water suspension to various Baumé strengths.

In order to give an idea of the variations that might occur when combining the starch with steep water removed from the steep tanks over a period of time and the range of products possible the following table is presented. The data in this table are based upon the use of variable strength treated steep water while maintaining constant the starch suspension at 14° Bé. or approximately 25% total solids by weight.

| | | | | |
|---|---|---|---|---|
| Bé. of treated steep water | 2.8 | 4.0 | 5.2 | 5.8 |
| Approx. total solids content of the treated steep water | 5.0 | 7.0 | 9.0 | 10.0 |

A 14° Bé. starch-treated steep water mixture (25% solids) is made from:

| | | | | |
|---|---|---|---|---|
| Pounds treated steep water | 100.0 | 100.0 | 100.0 | 100.0 |
| Pounds starch cake 45% water | 66.6 | 60.0 | 53.4 | 50.0 |
| Per cent steep solids in liquid-phase | 4.0 | 5.8 | 7.8 | 8.9 |
| Pounds bone dry starch in cake | 36.6 | 33.0 | 29.3 | 27.5 |
| Pounds steep solids in 45% H2O cake | 1.2 | 1.7 | 1.87 | 2.0 |
| Pounds final starch-protein product (dried to 10% moisture content) | 42.0 | 38.6 | 34.7 | 32.9 |
| Approx. per cent steep solids in final product | 2.86 | 4.4 | 5.4 | 6.1 |
| Approx. per cent protein in final product | 1.43 | 2.2 | 2.7 | 3.0 |

It is to be understood that various modifications and changes may be made in the above described processes and treating materials without departing from the scope of our invention. Some of the novel features of this invention are covered by the appended claims.

We claim:

1. A process of producing a cornstarch-protein brewing adjunct comprising substantially neutralizing steep water from corn, separating the neutralized liquid from the coagulated solids, adding said liquid to starch to effect an intimate admixture therewith, removing the excess liquid and drying the resulting starch and steep water mass.

2. A process of producing a cornstarch-protein brewing adjunct comprising, substantially neutralizing steep water from corn to precipitate the heat coagulable proteins and some of the undesired salts therein, separating the remaining liquid from the coagulum, mixing starch with said liquid to effect saturation of the starch with the liquid, removing the excess liquid and drying the resulting starch and steep water mass.

3. A process of producing a cornstarch-protein brewing adjunct comprising, substantially neutralizing steep water from corn with lime to precipitate the heat coagulable proteins and some of the undesired salts therein, separating the remaining liquid from the coagulum, mixing starch with said liquid to effect saturation of the starch with the liquid, removing the excess liquid and drying the resulting starch and steep water mass.

4. A process of producing a cornstarch-protein brewing adjunct comprising, treating corn steep water as it comes from the steeping tanks with lime to obtain a pH of between 5 and 7 to effect precipitation of the heat coagulable proteins normally contained in said steep water and to convert the sulphur compounds contained in said water into insoluble sulfites and sulfates, filtering the thus treated steep water to remove the precipitate, adding the remaining filtrate which contains soluble proteins and is substantially free of heat coagulable solids to a wet starch so that an intimate admixture of said starch and treated steep water is obtained and drying said admixture.

5. A process of producing a cornstarch-protein brewing adjunct comprising substantially neutralizing steep water from the corn to precipitate the heat coagulable proteins and some of the undesirable salts therein, removing the precipitate, treating the remaining liquid with an oxidizing agent to oxidize the sulphur compounds contained in said liquid to an insoluble form, filtering to remove said insoluble sulphur compound and admixing the remaining purified steep water with starch.

6. A process of producing a cornstarch-protein brewing adjunct comprising substantially neutralizing steep water from corn to coagulate heat coagulable proteins and other undesirable substances, filtering to remove the coagulated solids and using the remaining purified steep water to wash starch from a starch settling table whereby an intimate admixture of said starch and said purified steep water is obtained.

7. A process of producing a cornstarch-protein brewing adjunct in which starch is combined with steep water substantially free of heat coagulable proteins, the step of washing starch which is settled on starch tables with said treated steep water to remove the starch from said tables and simultaneously incorporate said treated steep water in said starch to form a starch-protein admixture.

8. A process of producing a cornstarch-protein brewing adjunct comprising substantially neutralizing steep water from corn to precipitate the heat coagulable proteins, separating the remaining liquid from the coagulum, treating said liquid with hydrogen peroxide to effect oxidation of the sulphur compounds into insoluble sulfates, filtering to remove said insoluble compounds, and washing the starch on a starch-settling table with the thus treated steep water to form an intimate admixture of said starch and treated steep water.

9. A process of producing a cornstarch-protein brewing adjunct comprising, substantially neutralizing steep water from corn to precipitate the heat coagulable proteins and some of the undesired salts therein, separating the remaining liquid from the coagulum, mixing partially gelatinized starch with said liquid to effect saturation of the starch with the liquid, removing the excess liquid and drying the resulting starch and steep water mass.

10. A process of producing a cornstarch-protein brewing adjunct comprising, substantially neutralizing steep water from corn to precipitate the heat coagulable proteins and some of the undesired salts therein, separating the remaining liquid from the coagulum, mixing starch with said liquid to effect saturation of the starch with the liquid, heating said starch and liquid mixture to effect partial gelatinization of said starch, removing the excess liquid and drying the resulting starch and steep water mass.

11. A new cornstarch-protein brewing adjunct for effecting rapid fermentation of beer without discoloring the beer, comprising an intimate admixture of starch and corn steep water added in substantially its original concentration but substantially free of heat coagulable proteins and sulphur compounds.

12. A process as defined in claim 1, which further comprises the step of partially gelatinizing the starch.

13. A product as defined in claim 11, in which the starch is at least partially gelatinized.

JAMES F. WALSH.
WILLARD L. MORGAN.